United States Patent [19]
Masse

[11] Patent Number: 5,807,058
[45] Date of Patent: Sep. 15, 1998

[54] TRUCK DECK WITH GROUND LEVEL LOADING/UNLOADING POSITION

[75] Inventor: Adrien L. Masse, Alberta, Canada

[73] Assignee: Absolute Ventures Inc., Alberta, Canada

[21] Appl. No.: 814,475

[22] Filed: Mar. 10, 1997

[51] Int. Cl.⁶ ...................................................... B60P 1/04
[52] U.S. Cl. .............................................................. 414/477
[58] Field of Search ................................... 414/477–480, 414/491–494, 500, 522, 538, 507, 462

[56] References Cited

U.S. PATENT DOCUMENTS

| | | | |
|---|---|---|---|
| 2,021,952 | 11/1935 | Wren | 414/500 |
| 2,938,642 | 5/1960 | Felix | 414/477 |
| 3,471,048 | 10/1969 | Terho | 414/491 X |
| 3,927,779 | 12/1975 | Johnson | 414/462 |
| 4,225,280 | 9/1980 | Brunet et al. | 414/479 |
| 5,203,667 | 4/1993 | Yoneda et al. | 414/477 |
| 5,556,249 | 9/1996 | Heine | 414/477 X |

FOREIGN PATENT DOCUMENTS

| | | | |
|---|---|---|---|
| 37967 | 12/1930 | France | 414/477 |
| 450038 | 2/1992 | Japan | 414/477 |
| 320 326 | 11/1970 | Sweden | 414/477 |
| 1234147 | 6/1971 | United Kingdom | 414/477 |
| 9008052 | 7/1990 | WIPO | 414/500 |

*Primary Examiner*—David A. Bucci
*Attorney, Agent, or Firm*—Anthony R. Lambert

[57] ABSTRACT

A truck deck with ground level loading/unloading position includes guide tracks supported by a support frame. Guide members consisting of pivotally connected sections are telescopically received in the guide tracks. A load platform is supported by and slidably movable in relation to the support frame. A first pair of chains pull the load platform and extend the guide members. When the guide members reach a fully extended position with the majority of the weight of the load platform past the pivot axis, they pivot and thereby guide the movement of the load platform in a downwardly direction onto a ground surface. A second pair of chains lift the load platform from the ground surface and move it along guide members until the guide members pivot to a substantially horizontal position. The second pair of chains then pull the load platform and the guide members back into a retracted position.

13 Claims, 10 Drawing Sheets

TRUCK DECK WITH GROUND LEVEL LOADING/UNLOADING POSITION

FIELD OF THE INVENTION

The present invention relates to a truck deck with ground level loading/unloading position and, in particular, such a truck deck that can be readily installed in a truck box of a pick up truck.

BACKGROUND OF THE INVENTION

There are very few truck decks that have a ground level position for loading and unloading. U.S. Pat. No. 5,203,667 discloses a lift frame which is pivotally and slidably mounted to a truck chassis. When the lift frame is tilted by an hydraulic cylinder, the lift frame slides until it contacts the ground. A movable platform is supported by the lift frame. A drive chain moves the platform along the lift frame, until the platform assumes a ground level position. The ground engaging end of the lift frame is curved to ease the transition in lowering the platform to the groundsurface. The remote end of the platform has ground engaging wheels that enable the platform to move smoothly back over the ground. Swedish Utlaggningsskrift 320 326 discloses a lift frame which is pivotally, but not slidably mounted to a truck chassis. The lift frame is tilted by means of an hydraulic cylinder. A movable platform is supported by the lift frame. A continuous drive chain moves the platform along the lift frame. A secondary chain linkage connects to the continuous drive chain to raise and lower a first end of the platform relative to ground level. The remote end of the platform serves as a skid which slides along the ground.

While the truck decks, as described above, are capable of being installed onto the chassis of a dump truck, they cannot be readily installed on a flat deck, such as the truck box of a pick up truck.

SUMMARY OF THE INVENTION

What is required is a truck deck with ground level loading/unloading position that can readily be installed onto a flat deck, such as the truck box of a pick up truck.

According to the present invention there is provided a truck deck with ground level loading/unloading position which includes a support frame having a first end and a second end. At least one guide track is supported by the support frame. The guide track extends from the second end toward the first end of the support frame, and has an access opening at the second end. At least one guide member is provided including a first section pivotally connected to a second section for pivotal movement about a substantially horizontal pivot axis. The at least one guide member is received in the at least one guide track and movable relative to the at least one guide track between a retracted position and an extended position. In the extended position, the second section of the at least one guide member protrudes from the at least one guide track sufficiently that the at least one guide member pivots about the pivot axis. A load platform is supported by and slidably movable in relation to the support frame and the at least one guide member. The load platform has a first end and a second end. First drive means are provided for moving the load platform toward the second end of the support frame and concurrently moving the at least one guide member toward the extended position. When the at least one guide member reaches the extended position, with the majority of the weight of the load platform past the pivot axis, the at least guide member pivots about the pivot axis lowering the second section of the at least one guide member and thereby guiding the movement of the load platform in a downwardly direction until the second end of the load platform rests upon a ground surface. The first drive means includes means for moving the load platform along the second section of the at least one guide member until the first end of the load platform also rests upon the ground surface. Second drive means is provided for lifting the first end of the load platform from the ground surface and moving the load platform along the second section of the at least one guide member until the at least one guide member pivots about the pivot axis to assume a substantially horizontal position. The second drive means includes means for moving the load platform toward the first end of the support frame and concurrently moving the at least one guide member toward the retracted position.

The truck deck, as described above, provides a ground level loading/unloading position within a support frame structure that can easily be bolted onto a pre-existing flat deck. Although the truck deck can be used with other types of vehicles, it was developed for use with pick up trucks. It is, therefore, preferred that the support frame be fabricated with dimensions which fit in the truck box of a pick up truck.

There are alternative drive systems which could be developed to impart the desired movement of the load platform. The preferred configuration for the first drive means includes at least one drive chain having a first end secured to a winch mounted on the support frame and a second end secured to the first end of the load platform. The drive chain is supported by at least one first chain guide positioned at the second end of the support frame and at least one chain guide on the first section and at least one chain guide on the second section of the at least one guide member. As the at least one drive chain is shortened by winding onto the winch, the first end of the load platform is pulled toward the chain guide on the second section of the at least one guide member. This moves the load platform toward the second end of the support frame. The chain guide on the first section of the guide member is drawn toward the first chain guide at the second end of the support frame concurrently moving the at least one guide member toward the extended position. When the at least one guide member reaches the extended position, with the majority of the weight of the load platform past the pivot axis, the at least one guide member pivots about the pivot axis lowering the second section of the at least one guide member and thereby guiding the movement of the load platform in a downwardly direction until the second end of the load platform rests upon a ground surface. As the first end of the load platform continues to be pulled toward the chain guide on the second section of the guide member, the load platform moves along the second section of the at least one guide member until first end of the load platform also rests upon the ground surface. The preferred configuration for the second drive means includes at least one drive chain having a first end secured to a winch mounted on the support frame and a second end secured to the second end of the load platform. The drive chain is supported by at least one chain guide on the first section and at least one chain guide on the second section of the at least one guide member. As the drive chain is shortened by winding onto the winch, the first end of the load platform is lifted from the ground surface and the load platform is pulled along the second section of the at least one guide member until the at least one guide members pivot about the pivot axis to assume a substantially horizontal position. As the drive chain continues to be shortened, the load platform is moved toward the first end of the support frame and concurrently the at least one guide member is moved toward the retracted position.

Although beneficial results may be obtained through the use of the truck deck, as described above, it is preferred that the first drive means and the second drive means work with a common winch and a common chain.

Although beneficial results may be obtained through the use of the truck deck as described above, a strain is placed upon the at least one drive chain as load platform pivots. Even more beneficial results may, therefore, be obtained when at least one guide cable is provided having a first end secured to the winch mounted on the support frame and a second end secured to the load platform. The at least one guide cable exerts a force upon the first end of the load platform. This helps control pivotal movement of the load platform.

Although beneficial results may be obtained through the use of the truck deck, as described above, even more beneficial results may be obtained when a shock absorbing spring is connected to the second end of the at least one guide cable. The spring absorbs any shock loading which otherwise may occur upon pivotal movement of the load platform.

Although beneficial results may be obtained through the use of the truck deck, as described above, the transition of lifting the load platform from ground level to the second section of the at least one guide member is a difficult one. This transition is made easier when a substantially vertically extending member is positioned at the first end of the load platform. The drive chain runs along the vertically extending member, ensuring that the initial force is a substantially vertical lifting force.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
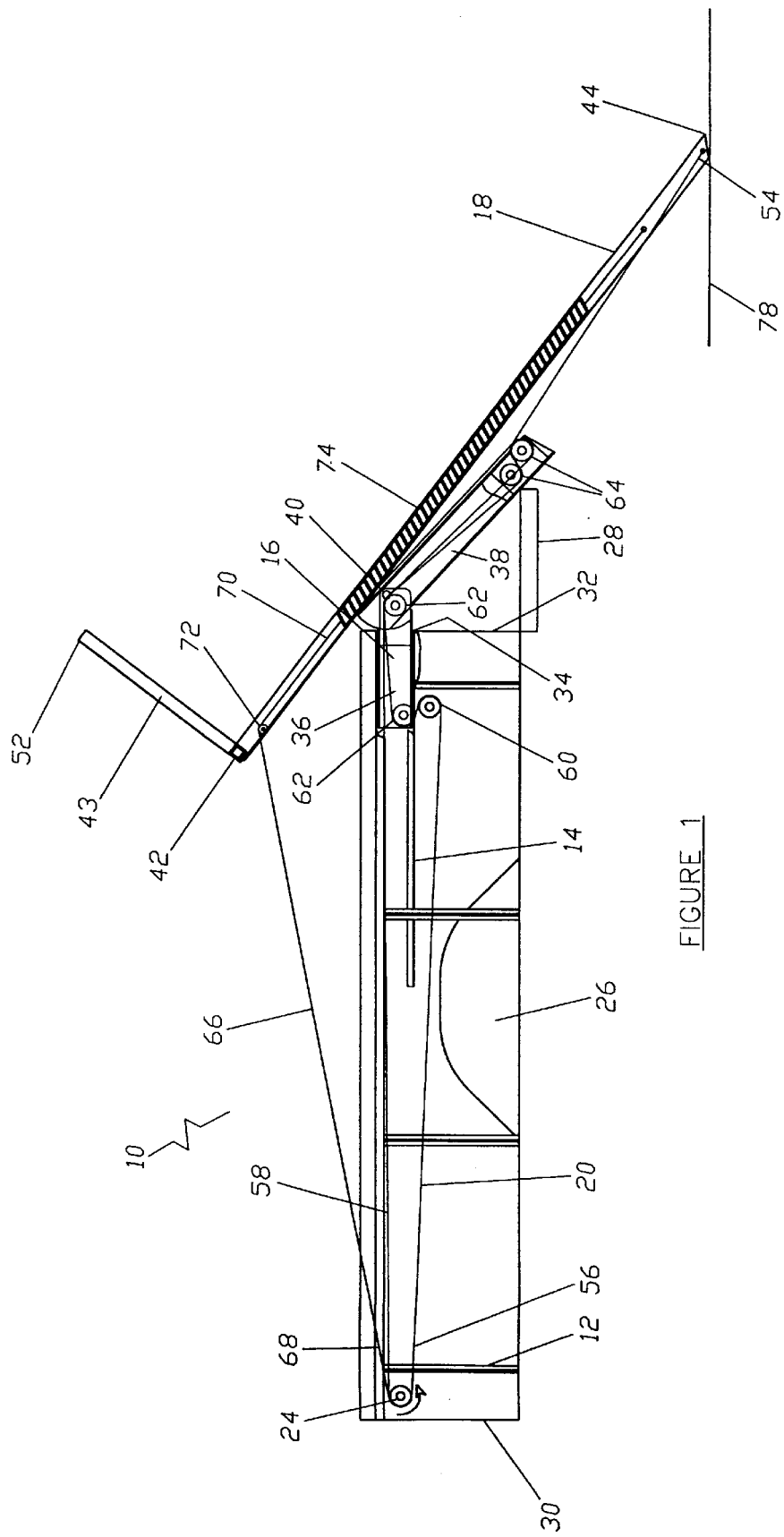
FIG. 1 is a side elevation view of a truck deck constructed in accordance with the teachings of the present invention.

The preferred embodiment, a truck deck with a ground level loading/unloading position generally identified by reference numeral 10, will now be described with reference to FIGS. 1 through 10.

Figure 2:
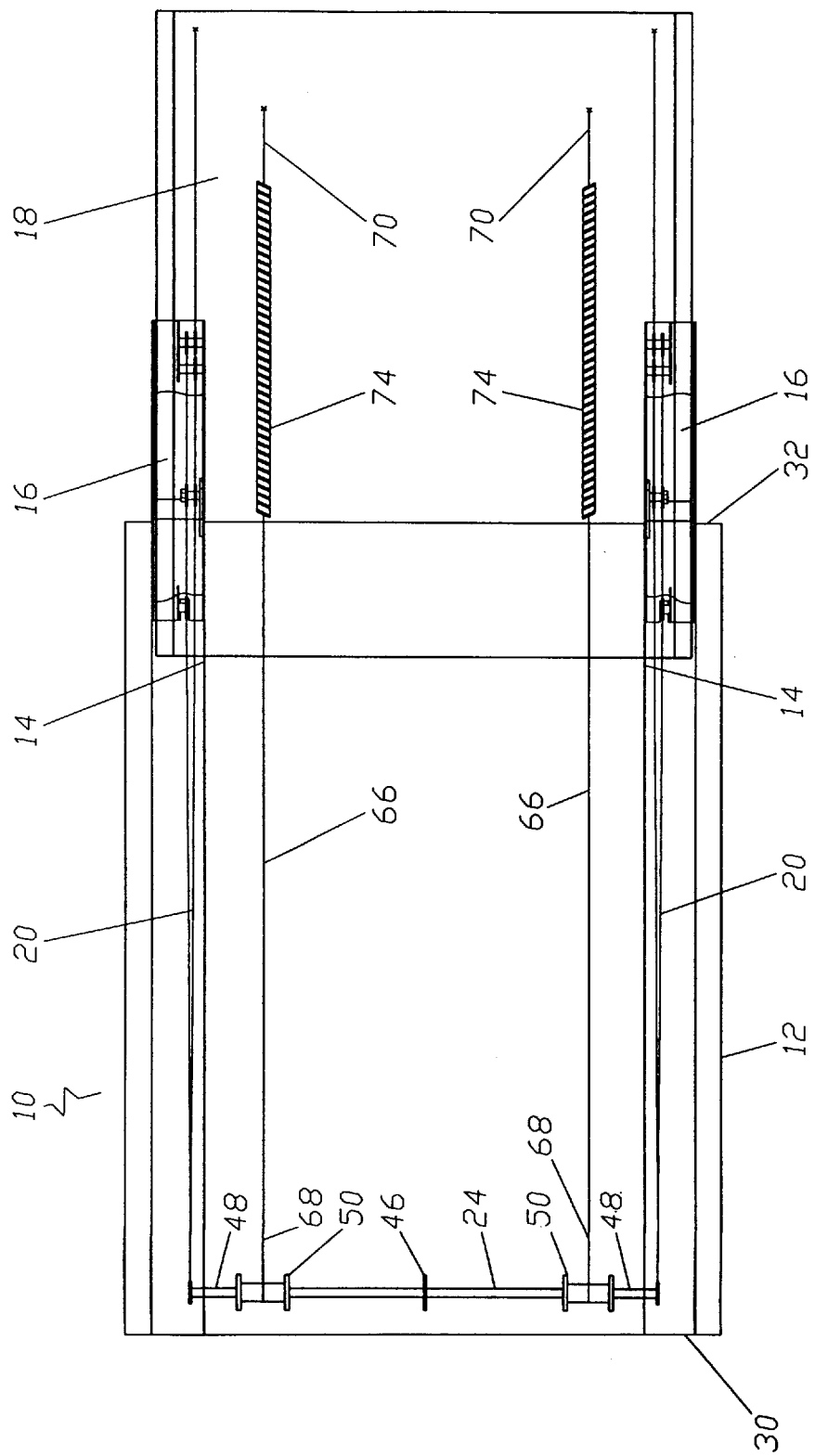
FIG. 2 is a top plan view of the truck deck illustrated in FIG. 1.
Figure 3:
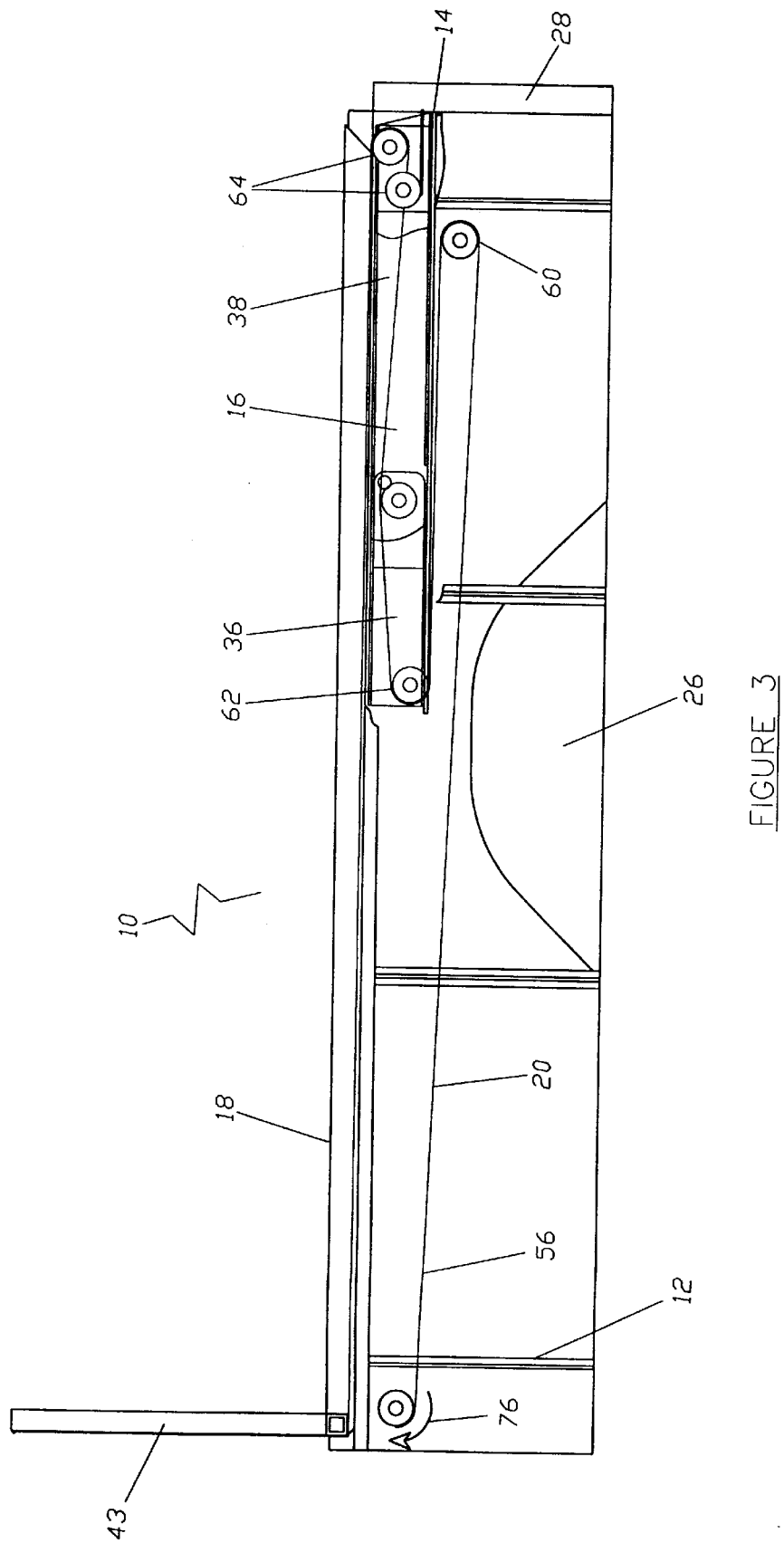
FIG. 3 is a side elevation view, being the first in a series of four drawings illustrating movement of the truck deck illustrated in FIG. 1 from a transport to a ground level loading/unloading position.
Figure 4:
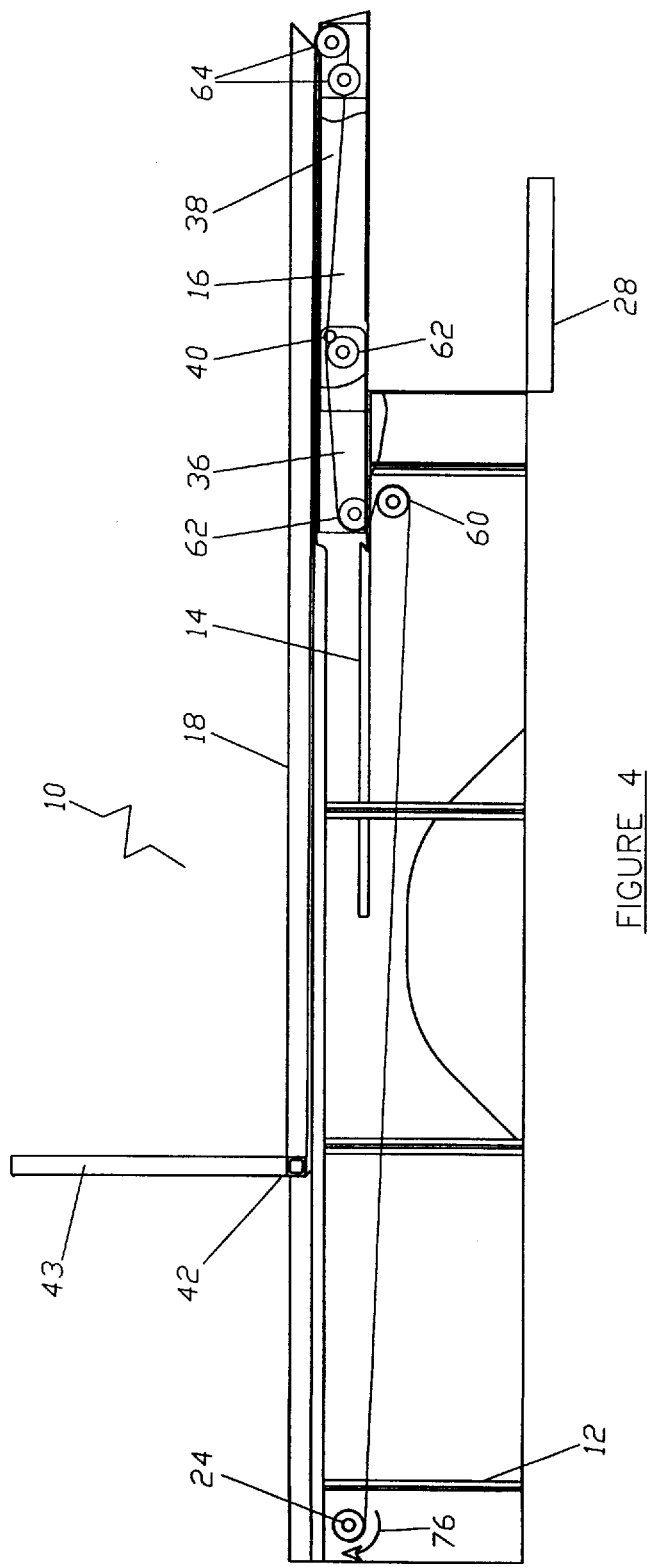
FIG. 4 is a side elevation view, being the second in a series of four drawings illustrating movement of the truck deck illustrated in FIG. 1 from a transport to a ground level loading/unloading position.
Figure 5:
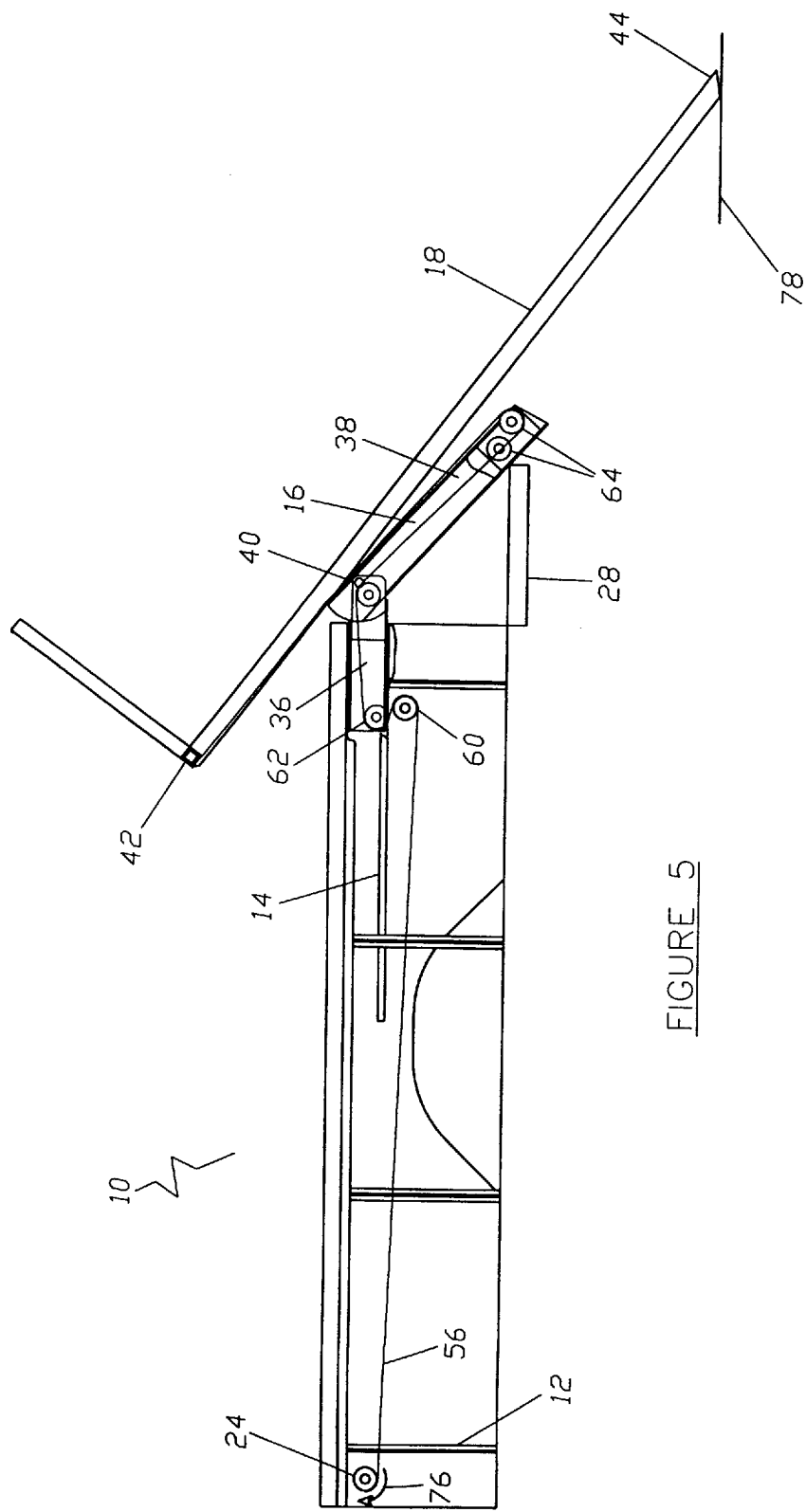
FIG. 5 is a side elevation view, being the third in a series of four drawings illustrating movement of the truck deck illustrated in FIG. 1 from a transport to a ground level loading/unloading position.
Figure 6:
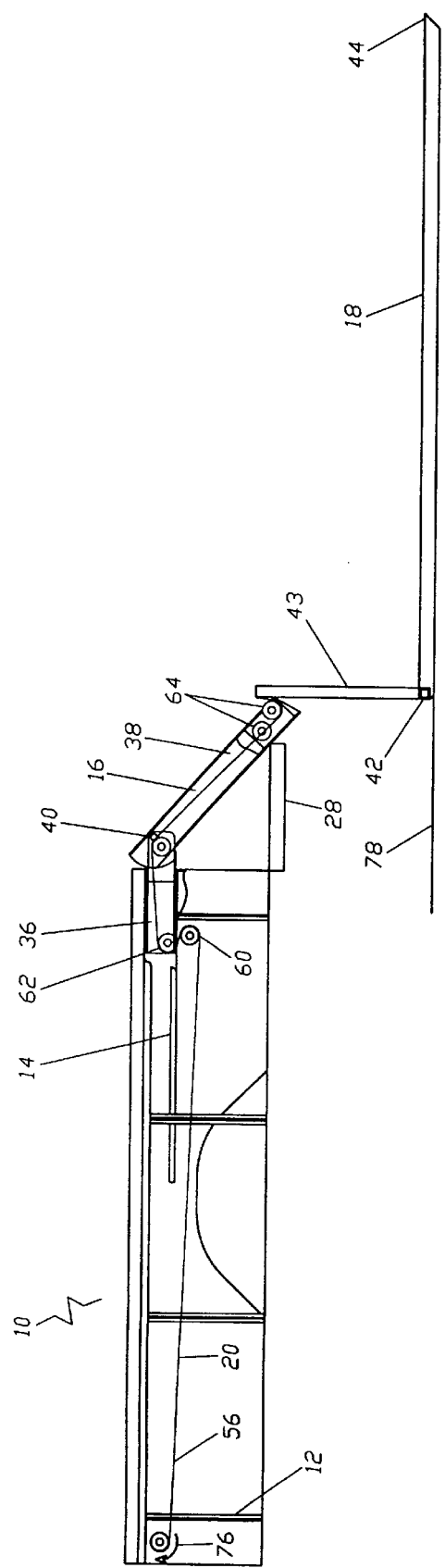
FIG. 6 is a side elevation view, being the fourth in a series of four drawings illustrating movement of the truck deck illustrated in FIG. 1 from a transport to a ground level loading/unloading position.

Referring to FIG. 1, the main components of truck deck 10 include a support frame 12, guide tracks 14, guide members 16, load platform 18, drive chains 20, and winch mechanism 24. Included in FIG. 1, is the environment in which truck deck 10 is intended to be installed. This environment includes a truck box 26 of a pick up truck (not shown) which is closed by a pivotally mounted tailgate 28. Support frame 12 has a first end 30 and a second end 32. It is preferred that support frame 12 be fabricated in dimensions that adapt support frame 12 to fit within truck box 26. It is also preferred that tailgate 28 is able to closed during transport. During installation support frame 12 is bolted in position. Referring to FIG. 2, it is preferred that a pair of guide tracks 14 be provided which are substantially horizontally supported in spaced relation by support frame 12. Referring to FIG. 1, each of guide tracks 14 have an access opening 34 at second end 32 of support frame 12 and extend from second end 12 inwardly toward first end 30. Referring to FIG. 2, it is preferred that a pair of guide members 16 are provided. Referring to FIG. 1, each of guide members 16 includes a first section 36 pivotally connected to a second section 38 for pivotal movement about a substantially horizontal pivot axis, represented by pivot pin 40. Guide members 16 are received in guide tracks 14. Guide members 14 are movable relative to guide tracks 14, between a retracted position as illustrated in FIG. 3 and an extended position, as illustrated in FIG. 4. Referring to FIGS. 5 and 6, in the extended position second section 38 of each of guide members 16 protrudes from guide tracks 14 sufficiently to expose pivot pin 40, enabling guide members 16 to pivot about the pivot axis provided by pivot pin 40. Referring to FIG. 1, load platform 18 has a first end 42 and a second end 44. A substantially vertically extending frame member 43 extends across first end 42 of load platform 18. Load platform 18 is supported by and slidably movable in relation to support frame 12 and guide members 16. The range of movement of load platform 18 is illustrated in FIGS. 3 through 6. Referring to FIG. 2, winch mechanism 24 is mounted at first end 30 of support frame 12. Winch mechanism 24 has a drive sprocket 46 which couples to a drive motor (not shown). Winch mechanism 24 has a pair of chain driving sprockets 48 and a pair of cable receiving spools 50. It is preferred that a pair of drive chains 20 be used, although it may be possible to obtain the same results through the use of cables. Referring to FIG. 1, each of drive chains 20 has a first end 52 and a second end 54. First end 52 is secured to vertically extending frame member 43 at first end 42 of load platform 18. Second end 54 is secured to second end 44 of load platform 18. Each of drive chains 20 is coupled with driving sprockets 48 of winch 24 in an intermediate position. Placing winch 24 in an intermediate position divides each of drive chains 20 into a first chain section 56 and a second chain section 58. First chain section 56 extends from winch 24 to first end 52 of drive chain 20. Second chain section 58 extends from winch 24 to second end 54 of drive chain 20. This configuration enables a single drive chain 20 to perform work that otherwise would require two separate drive chains. Upon rotation of winch 24 in a first direction, first chain section 56 is shortened and second chain section 58 is lengthened. Upon rotation of winch 24 in a second direction, first chain section 56 is lengthened and second chain section 58 is shortened. Referring to FIG. 1, each of drive chains 20 are supported by a plurality of chain guides 60, 62, and 64. Chain guides 60 are positioned at second end 32 of support frame 12. Chain guides 62 are positioned on first section 36 of guide members 16. Chain guides 64 are positioned on second section 38 of guide members 16. Referring to FIG. 1, it is preferred that a pair of guide cables 66 be provided. Each of guide cables 66 have a first end 68 and a second end 70. First end 68 is secured to one of spools 50 of winch 24. Second end 70 is secured to load platform 18. Each of guide cables 66 passes over a cable guide 72 positioned at first end 42 of load platform 18 and is connected to a shock absorbing spring 74.

Figure 7:
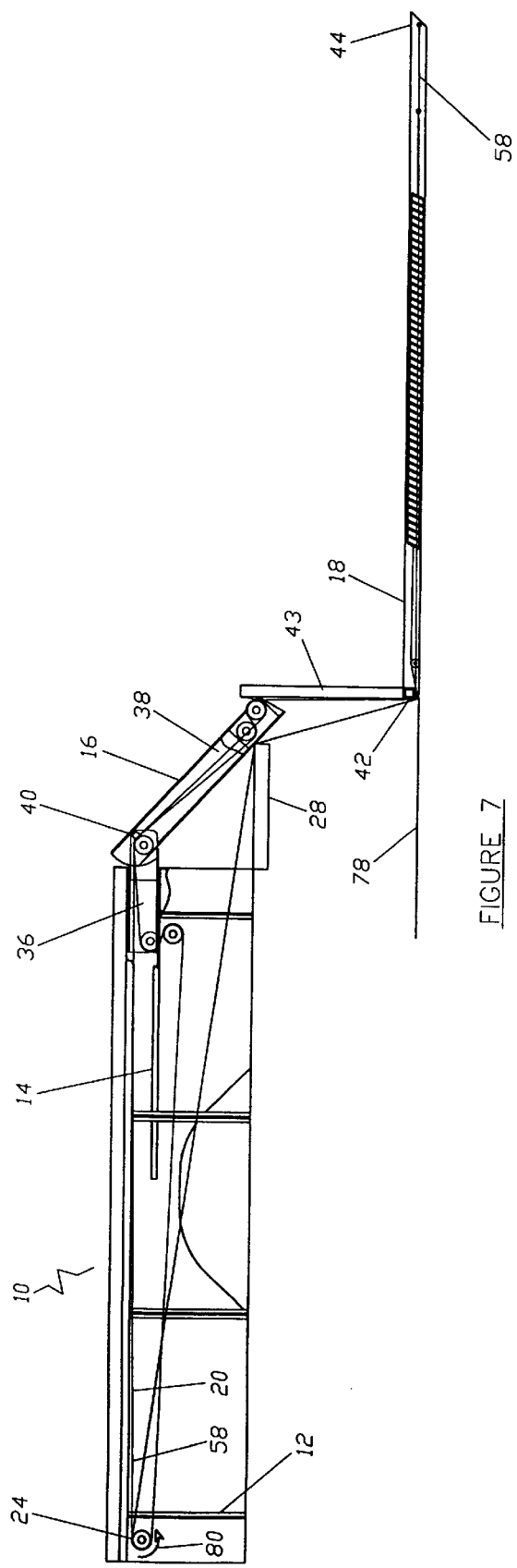
FIG. 7 is a side elevation view, being the first in a series of four drawings illustrating movement of the truck deck illustrated in FIG. 1 from a ground level loading/unloading position to a transport position.
Figure 8:
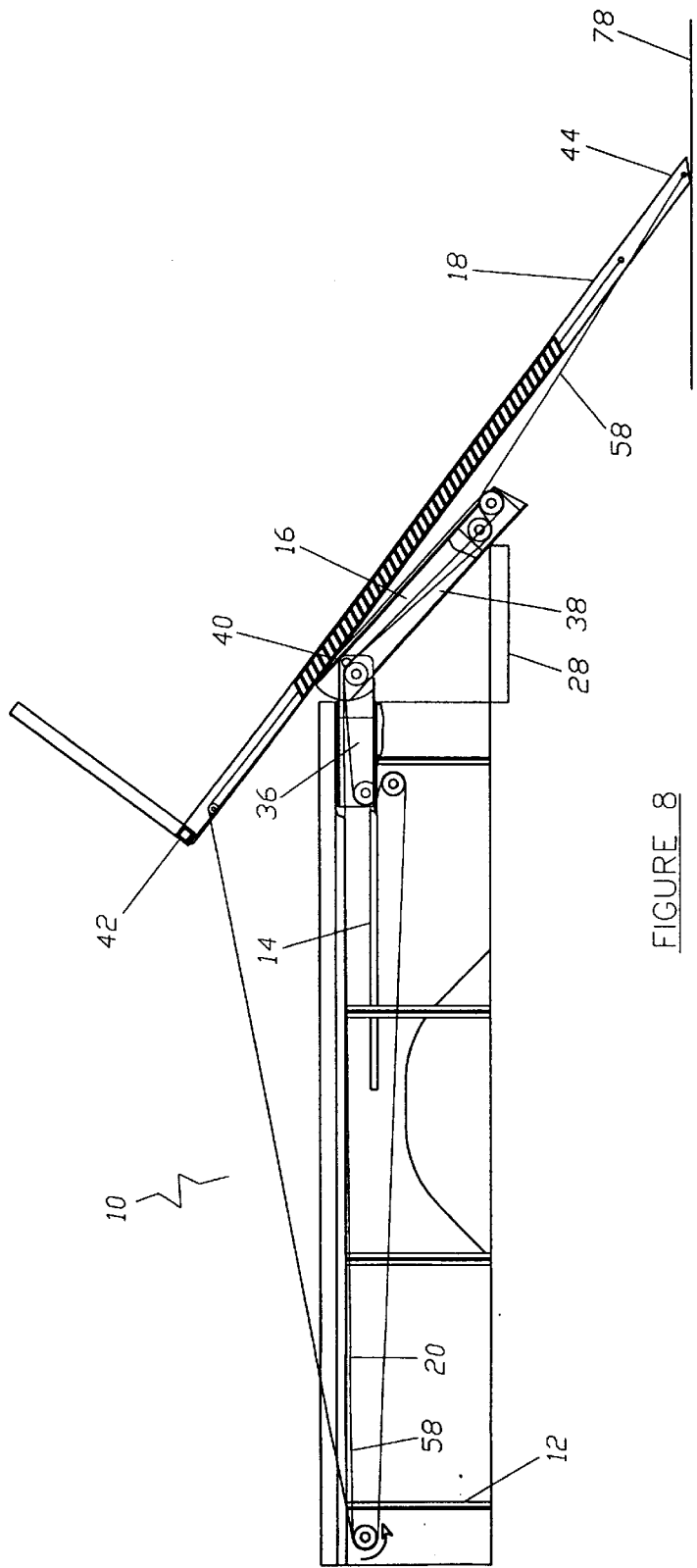
FIG. 8 is a side elevation view, being the second in a series of four drawings illustrating movement of the truck deck illustrated in FIG. 1 from a ground level loading/unloading position to a transport position.
Figure 9:
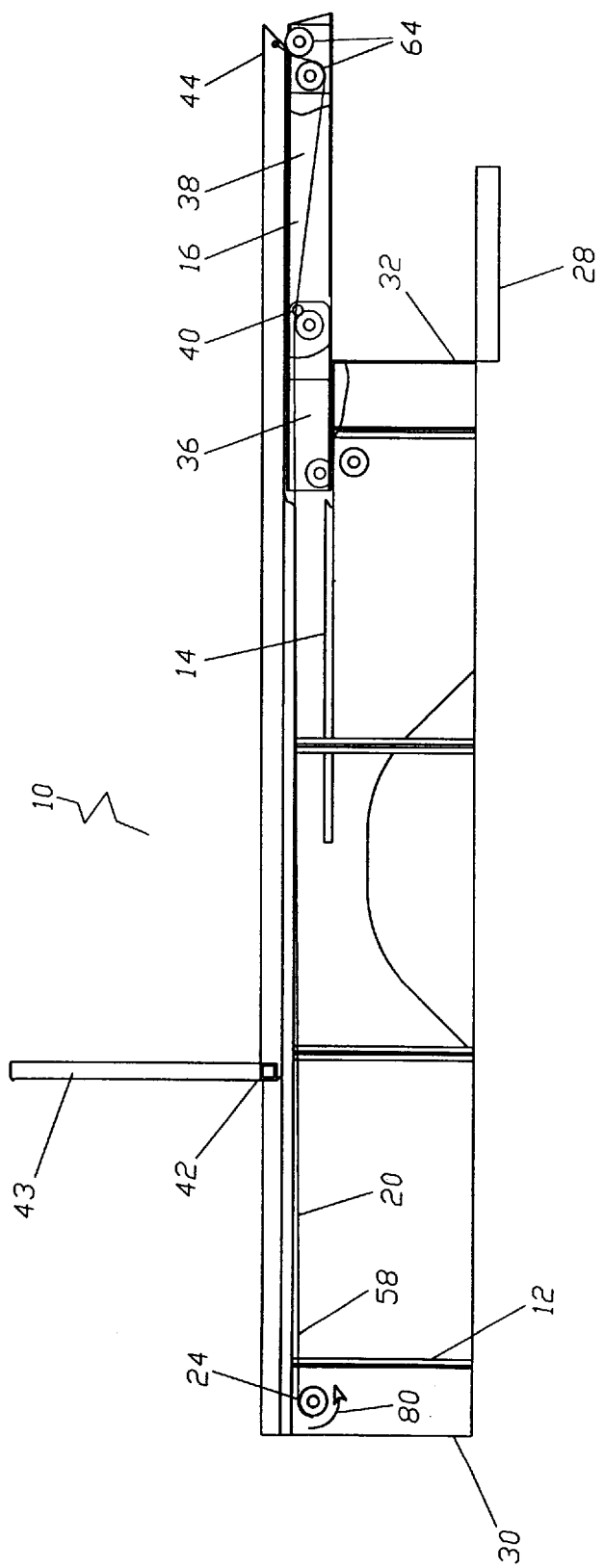
FIG. 9 is a side elevation view, being the third in a series of four drawings illustrating movement of the truck deck illustrated in FIG. 1 from a ground level loading/unloading position to a transport position.
Figure 10:
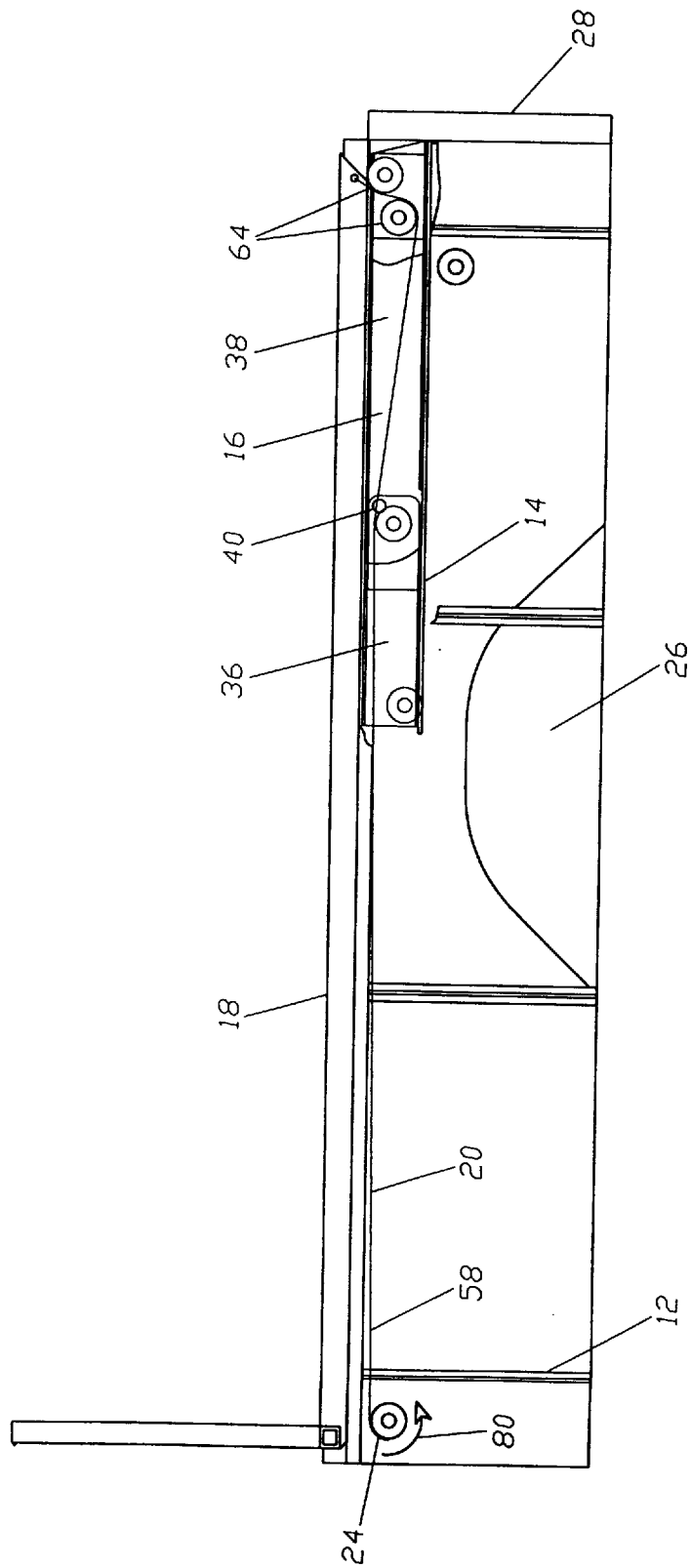
FIG. 10 is a side elevation view, being the fourth in a series of four drawings illustrating movement of the truck deck illustrated in FIG. 1 from a ground level loading/unloading position to a transport position.

The use and operation of truck deck 10 will now be described with reference to FIGS. 1 through 10. FIGS. 3 through 6 illustrate movement of truck deck 10 from a transport position to a ground level loading/unloading position. In order to simplify the drawings only first chain section 56 of drive chain 20 has been illustrated. FIG. 3 illustrates truck deck 10 in a transport position with tailgate 28 of truck box 26 in a closed position. FIG. 4 shows tailgate 28 in an open position with movement of load platform 18 in progress. Winch 24 is activated to rotate in a first or clockwise direction as indicated by arrow 76. The rotation of winch 24 in the first direction has the effect of shortening first chain section 56. As first chain section 56 is shortened, first end 42 of load platform 18 is pulled toward chain guides 64 on second section 38 of guide members 16, this moves load platform 18 along support frame 12, toward second end 32. The shortening of first chain section 56 also draws chain guides 62 on first section 36 of guide members 16 toward chain guide 60 at second end 32 of support frame 12. This concurrently moves guide members 16 toward the extended position. Referring to FIG. 5, when guide members 16 reach their fully extended position, guide members 16 are poised to pivot about pivot pin 40. This pivotal movement occurs when the majority of the weight of load platform 18 passes the pivot axis, which is pivot pin 40. When a load is placed at second end 44 of load platform 18, this pivotal movement will occur sooner than when load platform 18 is empty or has an evenly distributed load. The pivotal movement lowers second section 38 of the guide members 16, guiding the movement of load platform 18 in a downwardly direction until second end 44 of load platform 18 rests upon a ground surface 78, as illustrated in FIG. 6. Tailgate 28 serves to limit the pivotal movement, and consequently the angle of incline of second section 38. In installations not involving tailgate 28, some other form of pivotal stop would be used. As first chain section 56 of drive chain 20 continues to be shortened by operation of winch 24, first end 42 of load platform 18 continues to be pulled toward chain guides 64 on second section 38 of guide members 16. In view of the fact that first end 52 of drive chain 20 is secured to vertically extending frame member 43, when first end 42 of load platform 18 comes to rest immediately adjacent to chain guides 64 on second section of guide members 16 load platform 18 rests upon ground surface 78. FIGS. 7 through 10 illustrate movement of truck deck 10 from a ground level loading/ unloading position to a transport position. In order to simplify the drawings only second chain section 58 of drive chain 20 has been illustrated. FIG. 7 illustrates truck deck 10 in a ground level loading/unloading position with load platform 18 resting upon ground surface 78. Winch 24 is activated to rotate in a second or counterclockwise direction as indicated by arrow 80. The rotation of winch 24 in the second direction has the effect of shortening second chain section 58. It will be appreciate that the shortening of second chain section 58 has the effect of lengthening first chain section 56, as they are part of the same chain, drive chain 20. As second chain section 58 is shortened by rotation of winch 24 in the second direction, first end 42 of load platform 18 is lifted from ground surface 78. Referring to FIG. 8, as second chain section 58 is further shortened, load platform 18 is pulled along second section 38 of guide members 16 until guide members 16 pivot about pivot pin 40. Referring to FIG. 9, upon second section 38 of guide members 16 pivoting about pivot pin 40, guide members 16 assume a substantially horizontal position. As second chain section 58 continues to be shortened, load platform 18 is moved toward first end 30 of support frame 12. The shortening of second chain section 58 also pulls guide members 16 toward the retracted position, as illustrated in FIG. 10, with first end 42 of load platform 18 positioned at first end 30 of support frame 12 with guide members 16 fully retracted within guide tracks 14. Referring to FIGS. 1 and 2, it is preferred that guide cables 66 be provided to control pivotal movement of load platform 18. When guide members 16 pivot to incline second section 38 during the movement from the transport position to the ground level loading/unloading position, load platform 18 would tend to drop onto ground surface 78. The force of such descent is a product of mass times acceleration. Therefore, the greater the load (not shown) placed upon load platform 18, the greater the force with which load platform 18 descends. Springs 74 absorb the initial shock and guide cables 66 enable load platform 18 to be lowered under control to ground surface 78.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A truck deck with ground level loading/unloading position, comprising:

a support frame having a first end and a second end;

at least one guide track supported by the support frame, the guide track having an access opening at the second end and extending from the second end toward the first end;

at least one guide member, the at least one guide member including a second section pivotally connected to a first section for pivotal movement about a substantially horizontal pivot axis, the at least one guide member being received in the at least one guide track and movable relative to the at least one guide track between a retracted position and an extended position, in the extended position the second section of the at least one guide member protruding from the at least one guide track sufficiently that the second section of the at least one guide member pivots about the substantially horizontal pivot axis;

a load platform supported by and slidably movable in relation to the support frame and the at least one guide member, the load platform having a first end and a second end;

first drive means for moving the load platform toward the second end of the support frame and concurrently moving the at least one guide member toward the extended position, such that when the at least one guide member reaches the extended position with a majority of the weight of the load platform past the pivot axis, the second section of the at least guide member pivots about the substantially horizontal pivot axis lowering the second section of the at least one guide member and thereby guiding the movement of the load platform in a downwardly direction until the second end of the load platform rests upon a ground surface, the first drive means including means for moving the load platform along the second section of the at least one guide member until the first end of the load platform also rests upon the ground surface; and second drive means for lifting the first end of the load platform from the ground surface and moving the load platform along the second section of the at least one guide member until the second section of the at least one guide member pivots about the substantially horizontal pivot axis to assume a substantially horizontal position, the second drive means including means for moving the load platform toward the first end of the support frame and concurrently moving the at least one guide member toward the retracted position.

2. The truck deck as defined in claim 1, wherein the support frame is adapted to fit in the truck box of a pick up truck.

3. The truck deck as defined in claim 1, wherein first drive means includes at least one drive chain/cable having a first end secured to a winch mounted on the support frame and a second end secured to the first end of the load platform, the drive chain/cable being supported by at least one first chain/cable guide positioned at the second end of the support frame and at least one chain/cable guide on the first section and at least one chain/cable guide on the second section of the at least one guide member, such that as the at least one drive chain/cable is shortened by rotation of the winch in a first direction, the first end of the load platform is pulled toward the chain/cable guide on the second section of the at least one guide member thereby moving the load platform toward the second end of the support frame and the chain/cable guide on the first section of the guide member is drawn toward the first chain/cable guide at the second end of the support frame concurrently moving the at least one guide member toward the extended position, when the at least one guide member reaches the extended position with a majority of the weight of the load platform past the pivot axis, the second section of the at least one guide member pivots about the substantially horizontal pivot axis lowering the second section of the at least one guide member and thereby guiding the movement of the load platform in a downwardly direction until the second end of the load platform rests upon a ground surface, and as the first end of the load platform continues to be pulled toward the chain/cable guide on the second section of the guide member, the load platform moves along the second section of the at least one guide member until first end of the load platform also rests upon the ground surface.

4. The truck deck as defined in claim 1, wherein the second drive means includes at least one drive chain/cable having a first end secured to a winch mounted on the support frame and a second end secured to the second end of the load platform, the drive chain/cable being supported by at least one chain/cable guide on the first section and at least one chain/cable guide on the second section of the at least one guide member, such that as the drive chain/cable is shortened by rotation of the winch in a second direction the first end of the load platform is lifted from the ground surface and the load platform is pulled along the second section of the at least one guide member until the second section of the at least one guide members pivot about the substantially horizontal pivot axis to assume a substantially horizontal position and, as the drive chain/cable continues to be shortened, the load platform is moved toward the first end of the support frame and concurrently the at least one guide member is moved toward the retracted position.

5. The truck deck as defined in claims 3 or 4, wherein at least one guide cable is provided having a first end secured to the winch mounted on the support frame and a second end secured to the load platform, the at least one guide cable exerting a force upon the first end of the load platform, thereby controlling pivotal movement of the load platform.

6. The truck deck as defined in claim 5, wherein a shock absorbing spring is connected to the second end of the at least one guide cable.

7. The truck deck as defined in claim 1, wherein a substantially vertically extending member is positioned at the first end of the load platform.

8. The truck deck as defined in claim 1, wherein first drive means and the second drive means use at least one common drive chain/cable, the at least one common drive chain/cable having a first end secured to a first end of the load platform and a second end secured to the second end of the load platform, the at least one chain/cable being coupled with a winch in an intermediate position dividing the at least one chain/cable into a first chain/cable section extending from the winch to the first end and a second chain/cable section extending from the winch to the second end, such that upon rotation of the winch in a first direction the first chain/cable section is shortened and the second chain/cable section is lengthened and upon rotation of the winch in a second direction the first chain/cable section is lengthened and the second chain/cable section is shortened, the at least one common chain/cable being supported by at least one first chain/cable guide positioned at the second end of the support frame and at least one chain/cable guide on the first section and at least one chain/cable guide on the second section of the at least one guide member, such that as the first chain/cable section is shortened by rotation of the winch in the first direction, the first end of the load platform is pulled toward the chain/cable guide on the second section of the at least one guide member thereby moving the load platform toward the second end of the support frame and the chain/cable guide on the first section of the guide member is drawn toward the first chain/cable guide at the second end of the support frame concurrently moving the at least one guide member toward the extended position, when the at least one guide member reaches the extended position with a majority of the weight of the load platform past the pivot axis, the second section of the at least one guide member pivots about the substantially horizontal pivot axis lowering the second section of the at least one guide member and thereby guiding the movement of the load platform in a downwardly direction until the second end of the load platform rests upon a ground surface, and as the first end of the load platform continues to be pulled toward the chain/cable guide on the second section of the guide member, the load platform moves along the second section of the at least one guide member until first end of the load platform also rests upon the ground surface; and as the second chain/cable section is shortened by rotation of the winch in the second direction, the first end of the load platform is lifted from the ground surface and the load platform is pulled along the second section of the at least one guide member until the second section of the at least one guide member pivots about the substantially horizontal pivot axis to assume a substantially horizontal position and, as the second chain/cable continues to be shortened, the load platform is moved toward the first end of the support frame and concurrently the at least one guide member is moved toward the retracted position.

9. A truck deck with ground level loading/unloading position, comprising:

a support frame having a first end and a second end;

a pair of guide tracks substantially horizontally supported in spaced relation by the support frame, the guide tracks having access openings at the second end of the support frame and extending from the second end toward the first end;

a pair of guide members, each of the guide members including a second section pivotally connected to a first section for pivotal movement about a substantially horizontal pivot axis, the guide members being received in the guide tracks and movable relative to the guide tracks between a retracted position and an extended position, in the extended position the second section of each of the guide members protruding from the guide tracks sufficiently that the second section of the guide members pivot about the substantially horizontal pivot axis;

a load platform supported by and slidably movable in relation to the support frame and the guide members, the load platform having a first end and a second end;

a winch mounted at the first end of the support frame;

a first pair of drive chains having a first end secured to the winch and a second end secured to the first end of the load platform, each chain to the first pair of chains being supported by a first chain guide positioned at the second end of the support frame, by a chain guide on the first section and by a chain guide on the second section of each of the guide members, such that as the first chain is shortened by rotation of the winch in a first direction, the first end of the load platform is pulled toward the chain guide on the second section of the guide members thereby moving the load platform toward the second end of the support frame and the chain guide on the first section of the guide members is drawn toward the first chain guide at the second end of the support frame concurrently moving the guide members toward the extended position, when the guide members reach the extended position with a majority of the weight of the load platform past the pivot axis, the second section of each of the guide members pivots about the substantially horizontal pivot axis lowering the second section of the guide members and thereby guiding the movement of the load platform in a downwardly direction until the second end of the load platform rests upon a ground surface, and as the first end of the load platform continues to be pulled toward the chain guide on the second section of the guide members, the load platform moves along the second section of the guide members until the first end of the load platform also rests upon the ground surface;

a second pair of drive chains having a first end secured to the winch and a second end secured to the second end of the load platform and running the length of the load platform to the first end, each chain of the second pair of chains being supported by a chain guide on the first section and a chain guide on the second section of the guide members, such that as the second chain is shortened by rotation of the winch in a second direction the first end of the load platform is lifted from the ground surface and the load platform is pulled along the second section of the guide members until the second section of each of the guide members pivots about the substantially horizontal pivot axis to assume a substantially horizontal position and, as the second chain continues to be shortened, the load platform is moved toward the first end of the support frame and concurrently the guide members are moved toward the retracted position; and a pair of guide cables having a first end secured to the drive winch and a second end secured to the load platform, each cable of the pair of guide cables exerting a force upon the first end of the load platform, thereby controlling pivotal movement of the load platform.

10. The truck deck as defined in claim 9, wherein the support frame is adapted to fit in the truck box of a pick up truck.

11. The truck deck as defined in claim 9, wherein a substantially vertically extending member is positioned at the first end of the load platform.

12. The truck deck as defined in claim 9, wherein a shock absorbing spring is connected to the second end of each cable of the pair of guide cables.

13. A truck deck with ground level loading/unloading position, comprising:

a support frame having a first end and a second end, the support frame being adapted to fit in the truck box of a pick up truck;

a pair of guide tracks substantially horizontally supported in spaced relation by the support frame, the guide tracks having access openings at the second end of the support frame and extending from the second end toward the first end;

a pair of guide members, each of the guide members including a second section pivotally connected to a first section for pivotal movement about a substantially horizontal pivot axis, the guide members being received in the guide tracks and movable relative to the guide tracks between a retracted position and an extended position, in the extended position the second section of each of the guide members protruding from the guide tracks sufficiently that the second section of each of the guide members pivots about the substantially horizontal pivot axis;

a load platform supported by and slidably movable in relation to the support frame and the guide members, the load platform having a first end and a second end, a substantially vertically extending member being positioned at the first end of the load platform;

a winch mounted at the first end of the support frame;

a pair of drive chains, each of the drive chains having a first end secured to a first end of the load platform and a second end secured to the second end of the load platform, each of the drive chains being coupled with the winch in an intermediate position dividing the drive chains into first chain sections extending from the winch to the first end and second chain sections extending from the winch to the second end, such that upon rotation of the winch in a first direction the first chain section is shortened and the second chain section is lengthened and upon rotation of the winch in a second direction the first chain section is lengthened and the second chain section is shortened, the drive chains being supported by first chain guides positioned at the second end of the support frame, chain guides on the first section of the guide member and chain guides on the second section of the guide members, such that as the first chain section is shortened by rotation of the winch in the first direction, the first end of the load platform is pulled toward the chain guides on the second section of the guide members thereby moving the load platform toward the second end of the support frame drawing the chain guide on the first section of the guide members toward the first chain guides at the second end of the support frame to concurrently move the guide members toward the extended position, when the guide members reach the extended position with a majority of the weight of the load platform past the pivot axis, the second section of each of the guide members pivots about the substantially horizontal pivot axis lowering the second section of the guide members and thereby guiding the movement of the load platform in a downwardly direction until the second end of the load platform rests upon a ground surface, and as the first end of the load platform continues to be pulled toward the chain guide on the second section of the guide members, the load platform moves along the second section of the guide members until first end of the load platform also rests upon the ground surface; and as the second chain section is shortened by rotation of the winch in the second direction, the first end of the load platform is lifted from the ground surface and the load platform is pulled along the second section of the guide members until the second section of each of the guide members pivots about the substantially horizontal pivot axis to assume a substantially horizontal position and, as the second chain section continues to be shortened, the load platform is moved toward the first end of the support frame and concurrently the guide members are moved toward the retracted position; and a pair of guide cables having a first end secured to the winch and a second end secured to the load platform, each guide cable passing over a cable guide positioned at the first end of the load platform and being connected to a shock absorbing spring, thereby controlling pivotal movement of the load platform.

\* \* \* \* \*